(12) United States Patent
Morimoto (10) Patent No.: US 6,546,191 B1
(45) Date of Patent: Apr. 8, 2003

(54) RECORDING-REPRODUCING APPARATUS FOR PROGRESS TV SYSTEM

(75) Inventor: Takeshi Morimoto, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/194,684

(22) PCT Filed: Mar. 30, 1998

(86) PCT No.: PCT/JP98/01454

§ 371 (c)(1),
(2), (4) Date: Dec. 1, 1998

(87) PCT Pub. No.: WO98/47282

PCT Pub. Date: Oct. 22, 1998

(30) Foreign Application Priority Data

Apr. 15, 1997 (JP) ............................................... 9-096268

(51) Int. Cl.[7] .............................. H04N 5/91; H04N 5/93; G11B 27/00
(52) U.S. Cl. ............................. 386/65; 386/60; 386/62
(58) Field of Search ............................... 386/4, 60, 62, 386/65

(56) References Cited

U.S. PATENT DOCUMENTS

| 4,134,130 | A | | 1/1979 | Tachi | |
|---|---|---|---|---|---|
| 4,914,527 | A | * | 4/1990 | Asai et al. | 386/75 |
| 5,097,364 | A | * | 3/1992 | Goto et al. | 360/32 |
| 5,857,044 | A | * | 1/1999 | Ogawa et al. | 386/62 |
| 5,956,090 | A | * | 9/1999 | Yamauchi | 348/441 |
| 5,970,204 | A | * | 10/1999 | Higurashi | 386/65 |
| 6,078,448 | A | * | 6/2000 | Rijckaert et al. | 360/48 |
| 6,222,980 | B1 | * | 4/2001 | Asai et al. | 386/65 |

FOREIGN PATENT DOCUMENTS

EP 0 602 469 A2 6/1994

* cited by examiner

Primary Examiner—Andrew Christensen
Assistant Examiner—Polin Chieu
(74) Attorney, Agent, or Firm—Parkhurst & Wendel, L.L.P.

(57) ABSTRACT

To provide a recording-reproducing apparatus capable of controlling recorded addresses in a highly-accurate minimum recording unit by using an existing time code in order for recording a signal. The present invention realizes the compatibility of the apparatus with the existing time code and controls the recorded addresses by slightly changing a linear time code signal and assigning a time code corresponding to the minimum recording unit.

2 Claims, 10 Drawing Sheets

| FRAME NUMBER | UNITS DIGIT ||||  TENS DIGIT ||
|---|---|---|---|---|---|---|
| | FRAME 1 | FRAME 2 | FRAME 4 | FRAME 8 | FRAME 10 | FRAME 20 |
| 0 | 0 | 0 | 0 | 0 | 0 | 0 |
| 1 | 1 | 0 | 0 | 0 | 0 | 0 |
| 2 | 0 | 1 | 0 | 0 | 0 | 0 |
| 3 | 1 | 1 | 0 | 0 | 0 | 0 |
| 4 | 0 | 0 | 1 | 0 | 0 | 0 |
| 5 | 1 | 0 | 1 | 0 | 0 | 0 |
| 6 | 0 | 1 | 1 | 0 | 0 | 0 |
| 7 | 1 | 1 | 1 | 0 | 0 | 0 |
| 8 | 0 | 0 | 0 | 1 | 0 | 0 |
| 9 | 1 | 0 | 0 | 1 | 0 | 0 |
| 10 | 0 | 0 | 0 | 0 | 1 | 0 |
| 11 | 1 | 0 | 0 | 0 | 1 | 0 |
| 12 | 0 | 1 | 0 | 0 | 1 | 0 |
| 13 | 1 | 1 | 0 | 0 | 1 | 0 |
| 14 | 0 | 0 | 1 | 0 | 1 | 0 |
| 15 | 1 | 0 | 1 | 0 | 1 | 0 |
| 16 | 0 | 1 | 1 | 0 | 1 | 0 |
| 17 | 1 | 1 | 1 | 0 | 1 | 0 |
| 18 | 0 | 0 | 0 | 1 | 1 | 0 |
| 19 | 1 | 0 | 0 | 1 | 1 | 0 |
| 20 | 0 | 0 | 0 | 0 | 0 | 1 |
| 21 | 1 | 0 | 0 | 0 | 0 | 1 |
| 22 | 0 | 1 | 0 | 0 | 0 | 1 |
| 23 | 1 | 1 | 0 | 0 | 0 | 1 |
| 24 | 0 | 0 | 1 | 0 | 0 | 1 |
| 25 | 1 | 0 | 1 | 0 | 0 | 1 |
| 26 | 0 | 1 | 1 | 0 | 0 | 1 |
| 27 | 1 | 1 | 1 | 0 | 0 | 1 |
| 28 | 0 | 0 | 0 | 1 | 0 | 1 |
| 29 | 1 | 0 | 0 | 1 | 0 | 1 |

| FRAME NUMBER | UNITS DIGIT ||||  TENS DIGIT |||
|---|---|---|---|---|---|---|---|
| | FRAME 1 | FRAME 2 | FRAME 4 | FRAME 8 | FRAME 10 | FRAME 20 | FRAME 40 |
| 0 | 0 | 0 | 0 | 0 | 0 | 0 | 0 |
| 1 | 1 | 0 | 0 | 0 | 0 | 0 | 0 |
| 2 | 0 | 1 | 0 | 0 | 0 | 0 | 0 |
| 3 | 1 | 1 | 0 | 0 | 0 | 0 | 0 |
| 4 | 0 | 0 | 1 | 0 | 0 | 0 | 0 |
| 5 | 1 | 0 | 1 | 0 | 0 | 0 | 0 |
| 6 | 0 | 1 | 1 | 0 | 0 | 0 | 0 |
| 7 | 1 | 1 | 1 | 0 | 0 | 0 | 0 |
| 8 | 0 | 0 | 0 | 1 | 0 | 0 | 0 |
| 9 | 1 | 0 | 0 | 1 | 0 | 0 | 0 |
| 10 | 0 | 0 | 0 | 0 | 1 | 0 | 0 |
| 11 | 1 | 0 | 0 | 0 | 1 | 0 | 0 |
| 12 | 0 | 1 | 0 | 0 | 1 | 0 | 0 |
| 13 | 1 | 1 | 0 | 0 | 1 | 0 | 0 |
| 14 | 0 | 0 | 1 | 0 | 1 | 0 | 0 |
| 15 | 1 | 0 | 1 | 0 | 1 | 0 | 0 |
| 16 | 0 | 1 | 1 | 0 | 1 | 0 | 0 |
| 17 | 1 | 1 | 1 | 0 | 1 | 0 | 0 |
| 18 | 0 | 0 | 0 | 1 | 1 | 0 | 0 |
| 19 | 1 | 0 | 0 | 1 | 1 | 0 | 0 |
| 20 | 0 | 0 | 0 | 0 | 0 | 1 | 0 |
| 21 | 1 | 0 | 0 | 0 | 0 | 1 | 0 |
| 22 | 0 | 1 | 0 | 0 | 0 | 1 | 0 |
| 23 | 1 | 1 | 0 | 0 | 0 | 1 | 0 |
| 24 | 0 | 0 | 1 | 0 | 0 | 1 | 0 |
| 25 | 1 | 0 | 1 | 0 | 0 | 1 | 0 |
| 26 | 0 | 1 | 1 | 0 | 0 | 1 | 0 |
| 27 | 1 | 1 | 1 | 0 | 0 | 1 | 0 |
| 28 | 0 | 0 | 0 | 1 | 0 | 1 | 0 |
| 29 | 1 | 0 | 0 | 1 | 0 | 1 | 0 |

FIG. 5B

| FRAME NUMBER | UNITS DIGIT | | | | TENS DIGIT | | |
|---|---|---|---|---|---|---|---|
| | FRAME 1 | FRAME 2 | FRAME 4 | FRAME 8 | FRAME 10 | FRAME 20 | FRAME 40 |
| 30 | 0 | 0 | 0 | 0 | 1 | 1 | 0 |
| 31 | 1 | 0 | 0 | 0 | 1 | 1 | 0 |
| 32 | 0 | 1 | 0 | 0 | 1 | 1 | 0 |
| 33 | 1 | 1 | 0 | 0 | 1 | 1 | 0 |
| 34 | 0 | 0 | 1 | 0 | 1 | 1 | 0 |
| 35 | 1 | 0 | 1 | 0 | 1 | 1 | 0 |
| 36 | 0 | 1 | 1 | 0 | 1 | 1 | 0 |
| 37 | 1 | 1 | 1 | 0 | 1 | 1 | 0 |
| 38 | 0 | 0 | 0 | 1 | 1 | 1 | 0 |
| 39 | 1 | 0 | 0 | 1 | 1 | 1 | 0 |
| 40 | 0 | 0 | 0 | 0 | 0 | 0 | 1 |
| 41 | 1 | 0 | 0 | 0 | 0 | 0 | 1 |
| 42 | 0 | 1 | 0 | 0 | 0 | 0 | 1 |
| 43 | 1 | 1 | 0 | 0 | 0 | 0 | 1 |
| 44 | 0 | 0 | 1 | 0 | 0 | 0 | 1 |
| 45 | 1 | 0 | 1 | 0 | 0 | 0 | 1 |
| 46 | 0 | 1 | 1 | 0 | 0 | 0 | 1 |
| 47 | 1 | 1 | 1 | 0 | 0 | 0 | 1 |
| 48 | 0 | 0 | 0 | 1 | 0 | 0 | 1 |
| 49 | 1 | 0 | 0 | 1 | 0 | 0 | 1 |
| 50 | 0 | 0 | 0 | 0 | 1 | 0 | 1 |
| 51 | 1 | 0 | 0 | 0 | 1 | 0 | 1 |
| 52 | 0 | 1 | 0 | 0 | 1 | 0 | 1 |
| 53 | 1 | 1 | 0 | 0 | 1 | 0 | 1 |
| 54 | 0 | 0 | 1 | 0 | 1 | 0 | 1 |
| 55 | 1 | 0 | 1 | 0 | 1 | 0 | 1 |
| 56 | 0 | 1 | 1 | 0 | 1 | 0 | 1 |
| 57 | 1 | 1 | 1 | 0 | 1 | 0 | 1 |
| 58 | 0 | 0 | 0 | 1 | 1 | 0 | 1 |
| 59 | 1 | 0 | 0 | 1 | 1 | 0 | 1 |

| FRAME NUMBER | FRAME 1 | FRAME 2 | FRAME 4 | FRAME 8 | FRAME 16 | FRAME 32 |
|---|---|---|---|---|---|---|
| 0  | 0 | 0 | 0 | 0 | 0 | 0 |
| 1  | 1 | 0 | 0 | 0 | 0 | 0 |
| 2  | 0 | 1 | 0 | 0 | 0 | 0 |
| 3  | 1 | 1 | 0 | 0 | 0 | 0 |
| 4  | 0 | 0 | 1 | 0 | 0 | 0 |
| 5  | 1 | 0 | 1 | 0 | 0 | 0 |
| 6  | 0 | 1 | 1 | 0 | 0 | 0 |
| 7  | 1 | 1 | 1 | 0 | 0 | 0 |
| 8  | 0 | 0 | 0 | 1 | 0 | 0 |
| 9  | 1 | 0 | 0 | 1 | 0 | 0 |
| 10 | 0 | 1 | 0 | 1 | 0 | 0 |
| 11 | 1 | 1 | 0 | 1 | 0 | 0 |
| 12 | 0 | 0 | 1 | 1 | 0 | 0 |
| 13 | 1 | 0 | 1 | 1 | 0 | 0 |
| 14 | 0 | 1 | 1 | 1 | 0 | 0 |
| 15 | 1 | 1 | 1 | 1 | 0 | 0 |
| 16 | 0 | 0 | 0 | 0 | 1 | 0 |
| 17 | 1 | 0 | 0 | 0 | 1 | 0 |
| 18 | 0 | 1 | 0 | 0 | 1 | 0 |
| 19 | 1 | 1 | 0 | 0 | 1 | 0 |
| 20 | 0 | 0 | 1 | 0 | 1 | 0 |
| 21 | 1 | 0 | 1 | 0 | 1 | 0 |
| 22 | 0 | 1 | 1 | 0 | 1 | 0 |
| 23 | 1 | 1 | 1 | 0 | 1 | 0 |
| 24 | 0 | 0 | 0 | 1 | 1 | 0 |
| 25 | 1 | 0 | 0 | 0 | 1 | 0 |
| 26 | 0 | 1 | 0 | 1 | 1 | 0 |
| 27 | 1 | 1 | 0 | 1 | 1 | 0 |
| 28 | 0 | 0 | 1 | 1 | 1 | 0 |
| 29 | 1 | 0 | 1 | 1 | 1 | 0 |
| 30 | 0 | 1 | 1 | 1 | 1 | 0 |
| 31 | 1 | 1 | 1 | 1 | 1 | 0 |

FIG. 7B

| FRAME NUMBER | FRAME 1 | FRAME 2 | FRAME 4 | FRAME 8 | FRAME 16 | FRAME 32 |
|---|---|---|---|---|---|---|
| 32 | 0 | 0 | 0 | 0 | 0 | 1 |
| 33 | 1 | 0 | 0 | 0 | 0 | 1 |
| 34 | 0 | 1 | 0 | 0 | 0 | 1 |
| 35 | 1 | 1 | 0 | 0 | 0 | 1 |
| 36 | 0 | 0 | 1 | 0 | 0 | 1 |
| 37 | 1 | 0 | 1 | 0 | 0 | 1 |
| 38 | 0 | 1 | 1 | 0 | 0 | 1 |
| 39 | 1 | 1 | 1 | 0 | 0 | 1 |
| 40 | 0 | 0 | 0 | 1 | 0 | 1 |
| 41 | 1 | 0 | 0 | 1 | 0 | 1 |
| 42 | 0 | 1 | 0 | 1 | 0 | 1 |
| 43 | 1 | 1 | 0 | 1 | 0 | 1 |
| 44 | 0 | 0 | 1 | 1 | 0 | 1 |
| 45 | 1 | 0 | 1 | 1 | 0 | 1 |
| 46 | 0 | 1 | 1 | 1 | 0 | 1 |
| 47 | 1 | 1 | 1 | 1 | 0 | 1 |
| 48 | 0 | 0 | 0 | 0 | 1 | 1 |
| 49 | 1 | 0 | 0 | 0 | 1 | 1 |
| 50 | 0 | 1 | 0 | 0 | 1 | 1 |
| 51 | 1 | 1 | 0 | 0 | 1 | 1 |
| 52 | 0 | 0 | 1 | 0 | 1 | 1 |
| 53 | 1 | 0 | 1 | 0 | 1 | 1 |
| 54 | 0 | 1 | 1 | 0 | 1 | 1 |
| 55 | 1 | 1 | 1 | 0 | 1 | 1 |
| 56 | 0 | 0 | 0 | 1 | 1 | 1 |
| 57 | 1 | 0 | 0 | 1 | 1 | 1 |
| 58 | 0 | 1 | 0 | 1 | 1 | 1 |
| 59 | 1 | 1 | 0 | 1 | 1 | 1 |

FIG. 8

RECORDING-REPRODUCING APPARATUS FOR PROGRESS TV SYSTEM

TECHNICAL FIELD

The present invention relates to a recording-reproducing apparatus for recording a time code signal simultaneously with a picture signal.

BACKGROUND ART

A conventional picture-recording unit for broadcast that is one of the recording-reproducing apparatuses applies addressing to a picture signal material to be recorded every frame cycle by recording a time code signal simultaneously with recording of a picture signal.

A time code address assigned to the picture signal material every frame cycle in accordance with the time code is used for time alignment in editing or reproducing the picture signal material.

Figure 2:
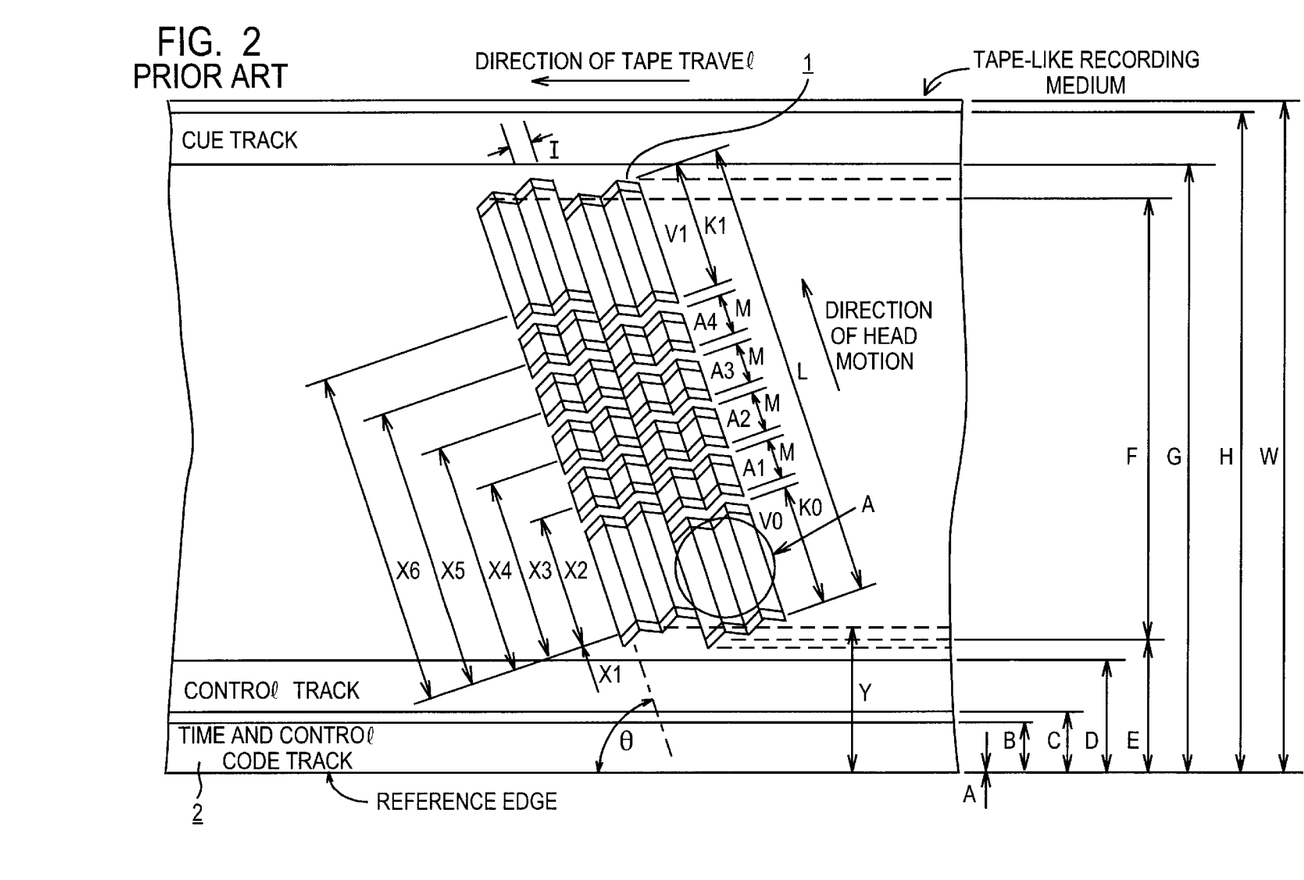
FIG. 2 is an illustration of tracks of a time code of a conventional recording-reproducing apparatus.

The broadcast standard SMPTE279 applied to the above picture recording unit for broadcast describes the format of D5VTR. FIG. 2 shows a tape-like recording medium cited from the standard. The above recording-reproducing apparatus records a picture signal in a helical track 1 and moreover, records a time code in another linear track 2.

Thus, a time code recorded in another linear track 2 separately from a picture signal is referred to as linear time code (hereafter abbreviated as LTC) and the LTC is also standardized in the broadcast standard SMPTE12M. Standardization of the LTC is applied to TV systems of 30, 25, and 24 frames per sec as described in the broadcast standard SMPTE12M. These TV systems are based on the existing broadcast systems such as NTSC (and HD), PAL, and interlace TV system for a film or the like.

In the case of the interlace TV system, one frame is constituted with a first field and a second field. The NTSC uses a type of band compression transmission in which 525 lines which is a total number of lines for one screen is divided into every 262.5 lines and data is separately transmitted in two fields. In this case, though the field frequency is 60 fields per sec, the frame frequency is 30 frames per sec.

The number of TV screens per sec of the interlace system uses not the number of fields but the number of frames. Therefore, the LTC standard is also specified so that a time code is allocated in frames as described in the broadcast standard SMPTE12M.

Figure 3:
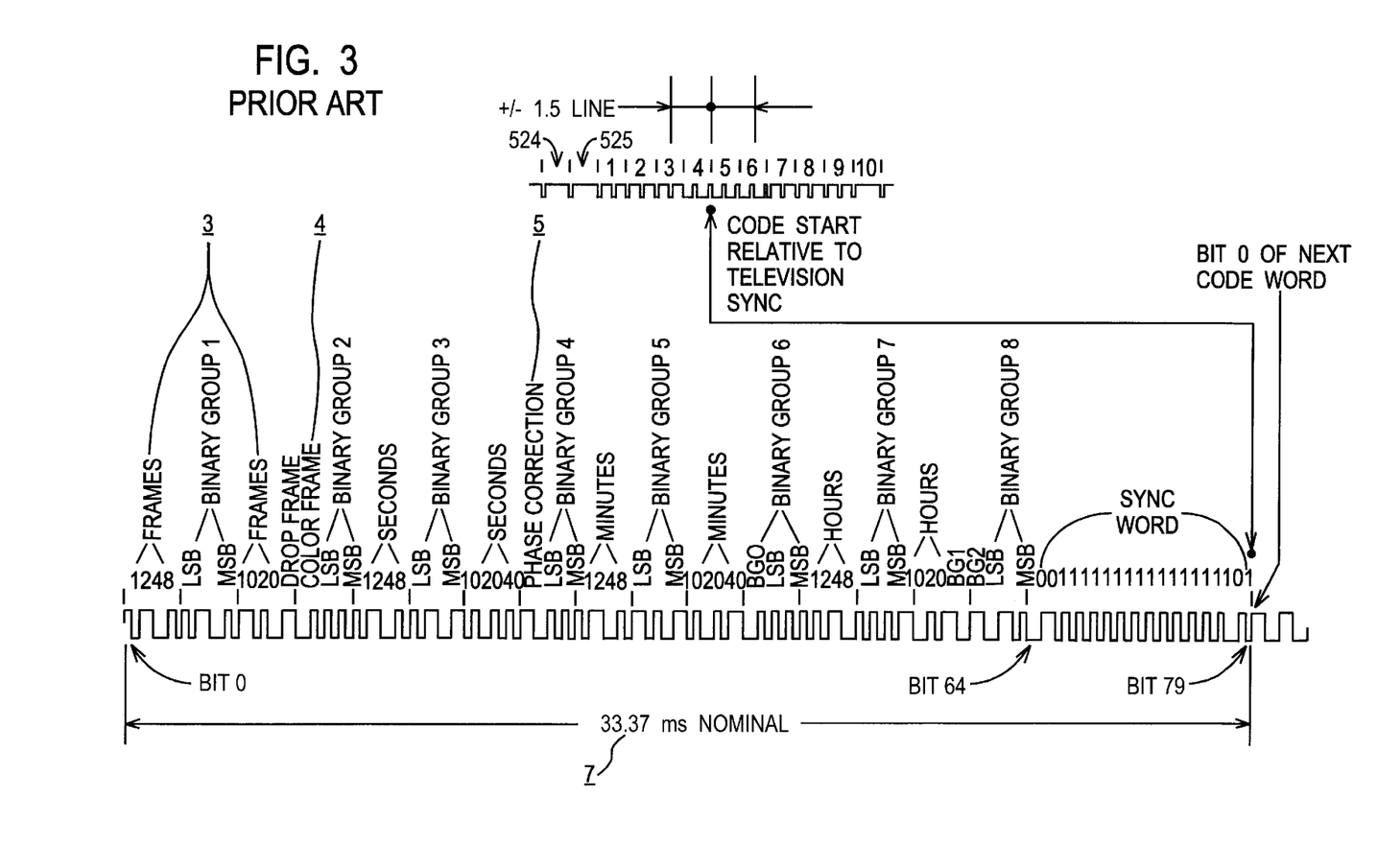
FIG. 3 is a phase-related diagram of a synchronizing signal and an LTC signal of the conventional recording-reproducing apparatus.

As shown in FIG. 3 cited from the broadcast standard SMPTE12M, the relation of phases between and cycles of a synchronizing signal and an LTC signal of the 525 TV system (NTSC system) are described. From FIG. 3, it is found that an LTC cycle 7 is 33.37 ms and there are 30 time codes per sec.

A frame number indication area 3 constituted with bits of 1FRAME, 2FRAME, 4FRAME, 8FRAME, 10FRAME, and 20FRAME for expressing a frame number is present at the head of the time code waveform shown in FIG. 3.

Figure 4:
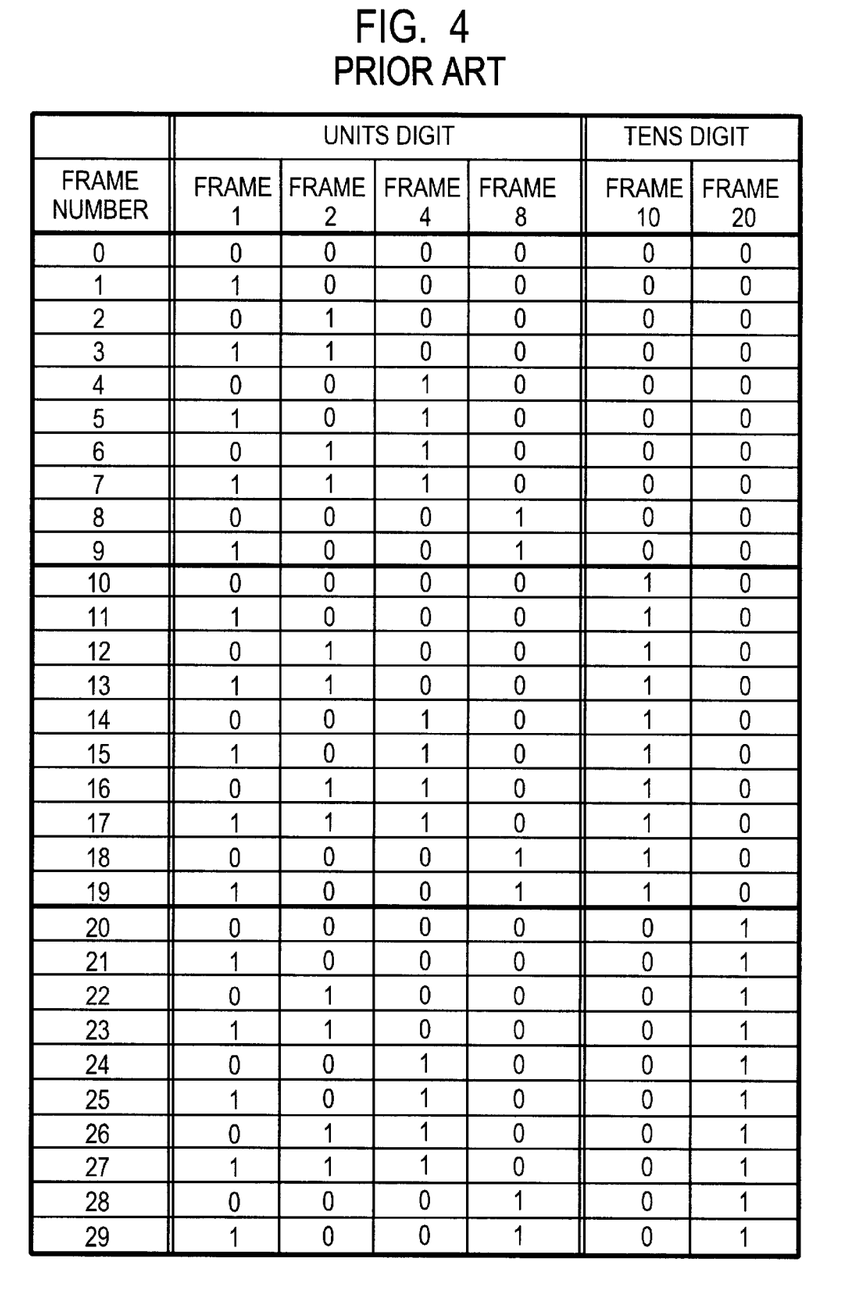
FIG. 4 is an illustration of a BCD notation of a frame number indication area of a conventional time code.

According to the standard, as shown in FIG. 4, the value of the decimal number of a frame number is divided into the tens digit and the units digit and these digits are respectively expressed by a binary number in accordance with the rule of BCD (Binary Coded Decimal). That is, two bits are assigned to the tens digit and four bits are assigned to the units digit and thereby, it is possible to express frame numbers of 0 to 29 with these six bits.

However, the above-described conventional recording-reproducing apparatus such as a picture recording unit for broadcast has the following problems on the progress system of the non-interlace system which has been noticed as a next-generation broadcast system instead of the interlace system.

First, the progress system is briefly described below.

For example, 525P of the progress system is not a system of transmitting 525 by dividing them into two fields based on the existing NTSC system but a system of handling 525 lines every 1/60 sec as shown in the broadcast standard SMPTE293M.

Because the progress system does not include the concept of a field, 60 frames are used every second and therefore, the number of screens per sec becomes 60. That is, in the case of the progress system, it is necessary to assign time codes corresponding to every screen to picture signals of 60 screens per sec.

According to the SMPTE12M of the LTC standard, as described in Background Art, it is impossible to assign time code values necessary for one second to the progress system of 60 frames per sec in the case of the conventional LTC-signal code configuration. Therefore, it is necessary to expand the conventional code configuration to a new LTC-signal code configuration.

Moreover, the D5VTR described in accordance with the recording format shown in FIG. 2 is a digital VTR which is developed to record digital picture signals in a broadcasting station. However, the digital VTR has been more frequently used as a data recorder not only for recording digital pictures but also for mainly recording and reproducing data. Also in this case, the conventional LTC is used to control addresses of recorded signals.

However, when using the digital VTR as a data recorder, the concept of a field in picture signal data is not present in the recorded data. As a result, the concept that two fields form one frame or a time code value can be assigned only every frame gets in the way. It is rather preferable that a time code is assigned every 1/60 see that is the minimum unit of VTR record. Also in this case, there is a problem that the number of frame numbers of LTC signals becomes insufficient similarly to the case of the progress system.

Therefore, a recording apparatus corresponding to the progress system which may spread as a next-generation broadcast system and a recorder such as a data recorder have a problem that an existing time code cannot control recorded addresses every 1/60 sec which is the minimum recording unit.

DISCLOSURE OF THE INVENTION

The present invention solves the above conventional problems and provides a recording-reproducing apparatus capable of controlling recorded addresses in a high-accuracy minimum recording unit by using an existing time code when recording signals of the TV system and the recording system requiring recorded address control every 1/60 sec which is the minimum recording unit under recording.

To solve the above problems, a recording-reproducing apparatus of the present invention is characterized by realizing its compatibility with an existing time code, slightly changing a linear time code signal, assigning a time code corresponding to the recording minimum unit, and controlling recorded addresses.

The recording-producing apparatus of embodiment one of the present invention is a recording-producing apparatus for recording a picture signal in a helical track of a tape-like recording medium and simultaneously recording a time code signal in a linear track, in which the time code having a frame number expressed with a decimal notation is defined so as to assign three bits to the tens digit and four bits to the units digit in order to express the tens digit and units digit with a BCD notation, and the time code in which the tens digit and units digit of the frame number are expressed with the BCD notation is recorded every vertical period of the picture signal in accordance with the definition.

The recording-producing apparatus of embodiment two is a recording-producing apparatus for recording a picture signal in a helical track of a tape-like recording medium and simultaneously recording a time code signal in a linear track, in which the time code having a frame number expressed with a decimal notation is defined so as to assign six bits to the frame number in order to express the frame number with a binary notation, and the time code in which the frame number is expressed with the binary notation is recorded every vertical period of the picture signal in accordance with the definition.

The recording-producing apparatus of embodiment three is a recording-producing apparatus for recording a picture signal in a helical track of a tape-like recording medium and simultaneously recording a time code signal in a linear track, in which the time code having a frame number expressed with a decimal notation is defined so as to use a field decision bit for deciding the field of one frame thereof as a group of two fields of said picture signal, and moreover defined to assign two bits to the tens digit of the frame number and four bits to the units digit of the frame number in order to express the tens digit and units digit with a BCD notation respectively, and the time code in which the tens digit and units digit of the frame number are expressed with the BCD notation is recorded every vertical period of the picture signal in accordance with the definition.

According to the above structures, compatibility with an existing time code is made possible and a recorded address is controlled by slightly changing a linear time code signal and assigning a time code corresponding to the minimum recording unit.

As described above, when recording signals of the TV system and the recording system requiring recorded address control every 1/60 sec which is the minimum recording unit correspondingly to the systems, it is possible to control recorded addresses in the accurate minimum recording unit by using existing time codes.

BEST MODE FOR CARRYING OUT THE INVENTION

Recording-reproducing apparatuses showing embodiments of the present invention are specifically described below by referring to the accompanying drawings.

In the case of the linear time code shown in FIG. 3 described in Background Art, purposes of all bits from 0 to 79 are determined but there is no free bit. However, in the actual state of use, there are some bits that are unnecessary though purposes of them are determined. These unnecessary bits are used for expansive expression of a frame number.

First example of unnecessary bits is the COLOR FRAME bit 4 in FIG. 3.

In the case of a color-decoding picture signal such as the existing NTSC, a color frame is defined because a burst phase is inverted every frame. Therefore, a color frame A and a color frame B can be separately defined for each frame. However, though a decision bit for the color frames A and B is superimposed on the COLOR FRAME bit 4, it is rarely used in fact.

Moreover, signals purposed by the present invention are a progress signal and the data in a data recorder. Therefore, the above COLOR FRAME bit 4 is a meaningless bit.

Second example of unnecessary bits is the PHASE CORRECTION bit 5 in FIG. 3.

The outline of the PHASE CORRECTION bit 5 is described below. The PHASE CORRECTION bit 5 is a type of a redundant bit for always controlling the number of zeros in 80 bits from 0 to 79 which are components of one time code to an even number. Thus, it is possible to make the starting phase of a modulated LTC waveform constant.

However, an actual LTC reading unit (e.g. LTC reader) is designed so as to be able to read the starting phase of an LTC even when it is not constant and therefore, it can be said that control of the PHASE CORRECTION bit 5 is unnecessary.

(First Embodiment)

Figure 5A:
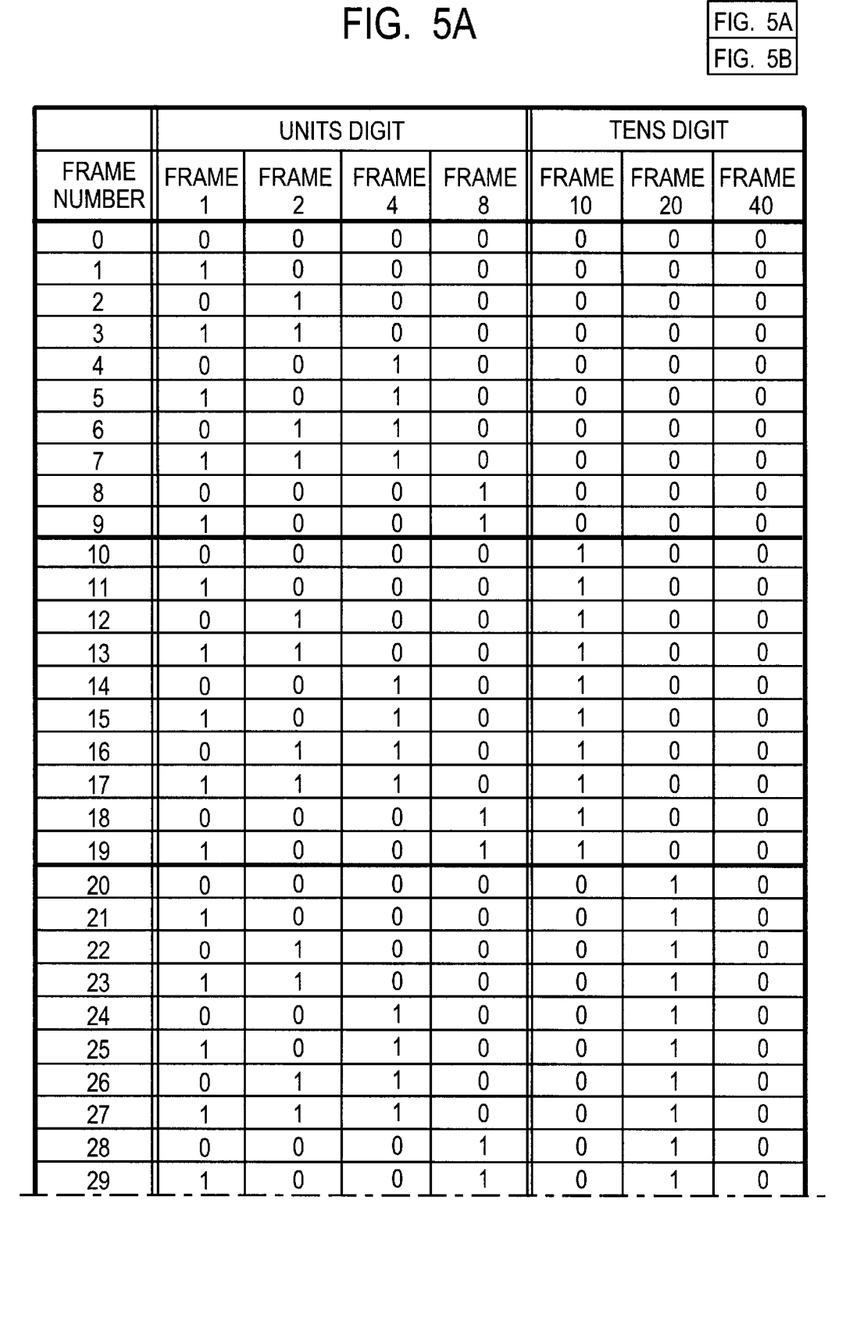
FIG. 5 is an illustration of BCD notation expansion of the recording-reproducing apparatus of the first embodiment of the present invention.
Figure 5B:
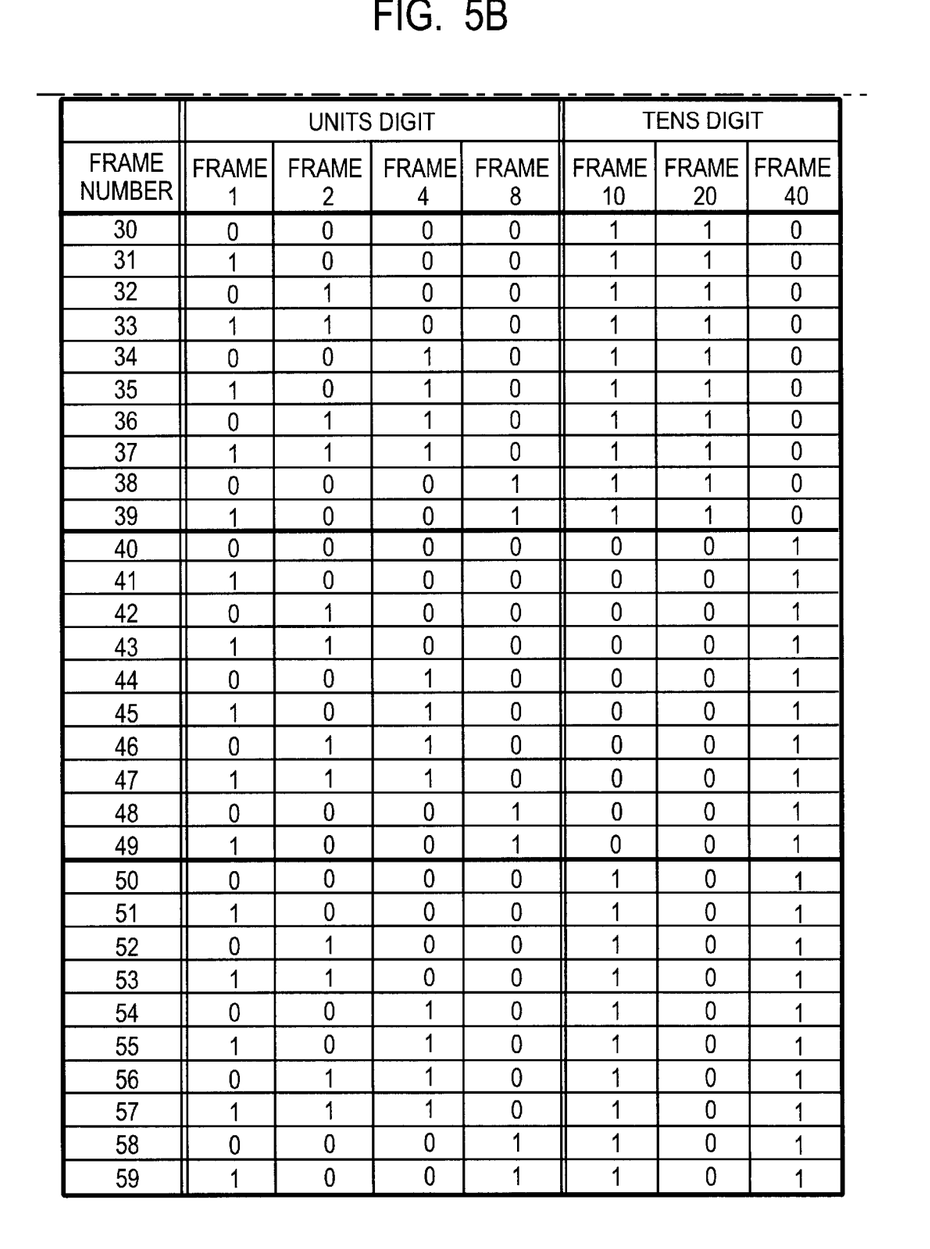

By considering the above state of use, a time code of a recording-reproducing apparatus of the first embodiment expands an upper limit value capable of securing the above unnecessary bit and expressing them as a frame number as shown in FIG. 5.

In FIG. 5, by using unnecessary bits for expression of the tens digit of a frame number, four bits are assigned to the units digit and three bits are assigned to the tens digit. This is a case of realizing time codes corresponding to signals of 60 frames per sec with the conventional BCD notation. The upper limit expressible by increasing one bit is 80 frames.

Figure 1:
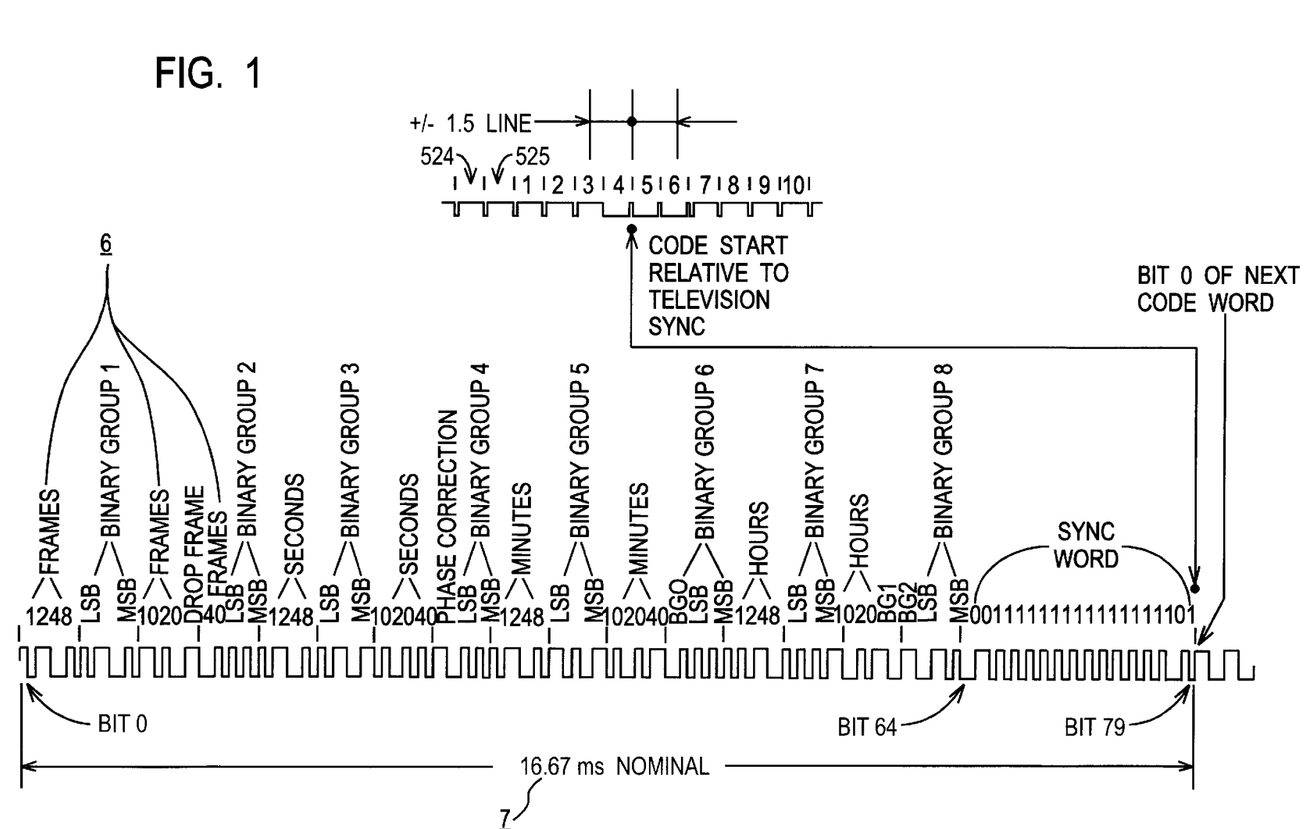
FIG. 1 is an illustration of waveforms of the 525P system of a recording-reproducing apparatus of a first embodiment of the present invention.

FIG. 1 is an example of BCD expansion of a linear time code of the 525P system in the first embodiment. This example is an example of the BCD expansion 6 of the frame number indication area using the COLOR FRAME bit 4 in FIG. 3 as a bit for expressing 40FRAME. Moreover, to correspond to a progress signal, the LTC cycle 7 of an LTC waveform becomes 16.67 ms which is the half of the conventional cycle and the LTC waveform is constituted with 60 time codes per sec. Therefore, it is possible to realize time codes accurately corresponding to 60 screens per sec of the progress signal.

(Second Embodiment)

Figure 6:
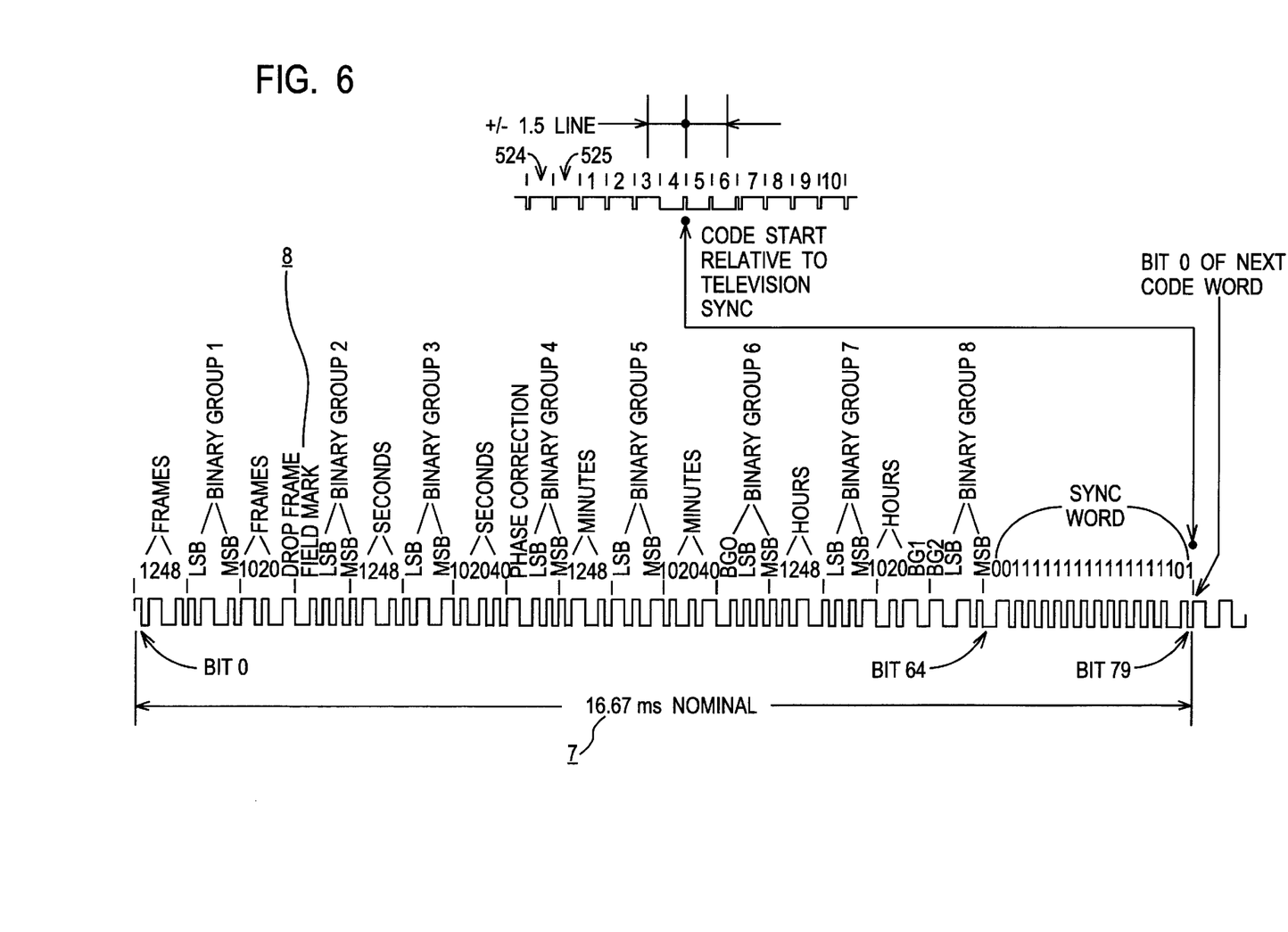
FIG. 6 is an illustration of the 525P system of a recording-reproducing apparatus of a second embodiment of the present invention.

A time code of a recording-reproducing apparatus of the second embodiment is another embodiment for increasing the number of time codes which can be expressed for one second by securing the above unnecessary one bit as shown in FIG. 6.

In the case of this example, the conventional signal configuration using two fields as one frame is left even in a progress signal in order to leave the similarity with the conventional signal configuration using two fields as one frame. Therefore, a code of a first field and a code of a second field are formally provided for a frame generated every 1/60 sec. The field codes are allocated to secured unnecessary bits. Moreover, a number using two fields as one frame is assigned to the frame number indication area 3 used for the time code in FIG. 3 as ever. In this case, the number of frame numbers per sec is 30 that is equal to the existing number of frame numbers per sec.

FIG. 6 is a time code of the recording-reproducing apparatus of this the second embodiment, which is an example of the linear time code waveform of the 525P system using FIELD MARK. This is an example of using the COLOR FRAME bit 4 in FIG. 3 which is an unnecessary bit as a FIELD MARK bit 8 expressing a field code. Moreover, to correspond to a progress signal, the LTC cycle 7 of an LTC waveform becomes 16.67 ms which is the half of the conventional cycle and the LTC waveform is constituted with 60 time codes per sec. Therefore, a time code accurately corresponding to 60 screens per sec of the progress signal can be realized.

(Third Embodiment)

Figure 7A:
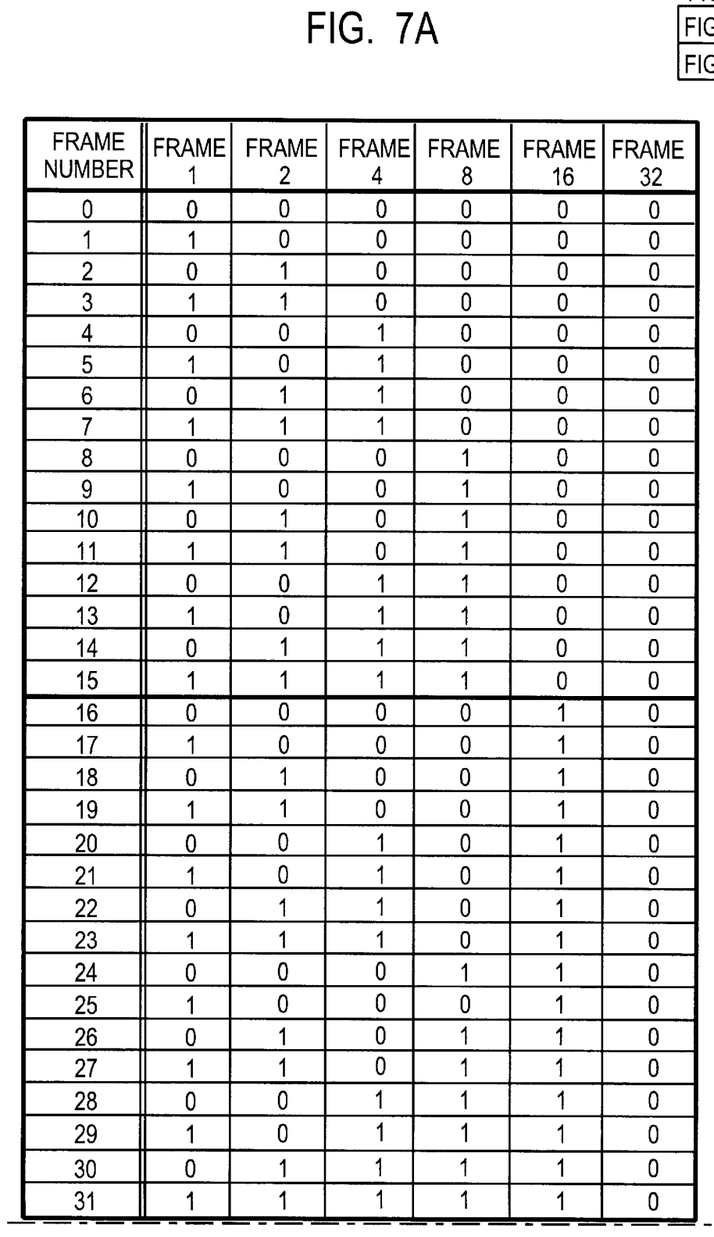
FIG. 7 is an illustration of a time code of a recording-reproducing apparatus of a third embodiment of the present invention.
Figure 7B:
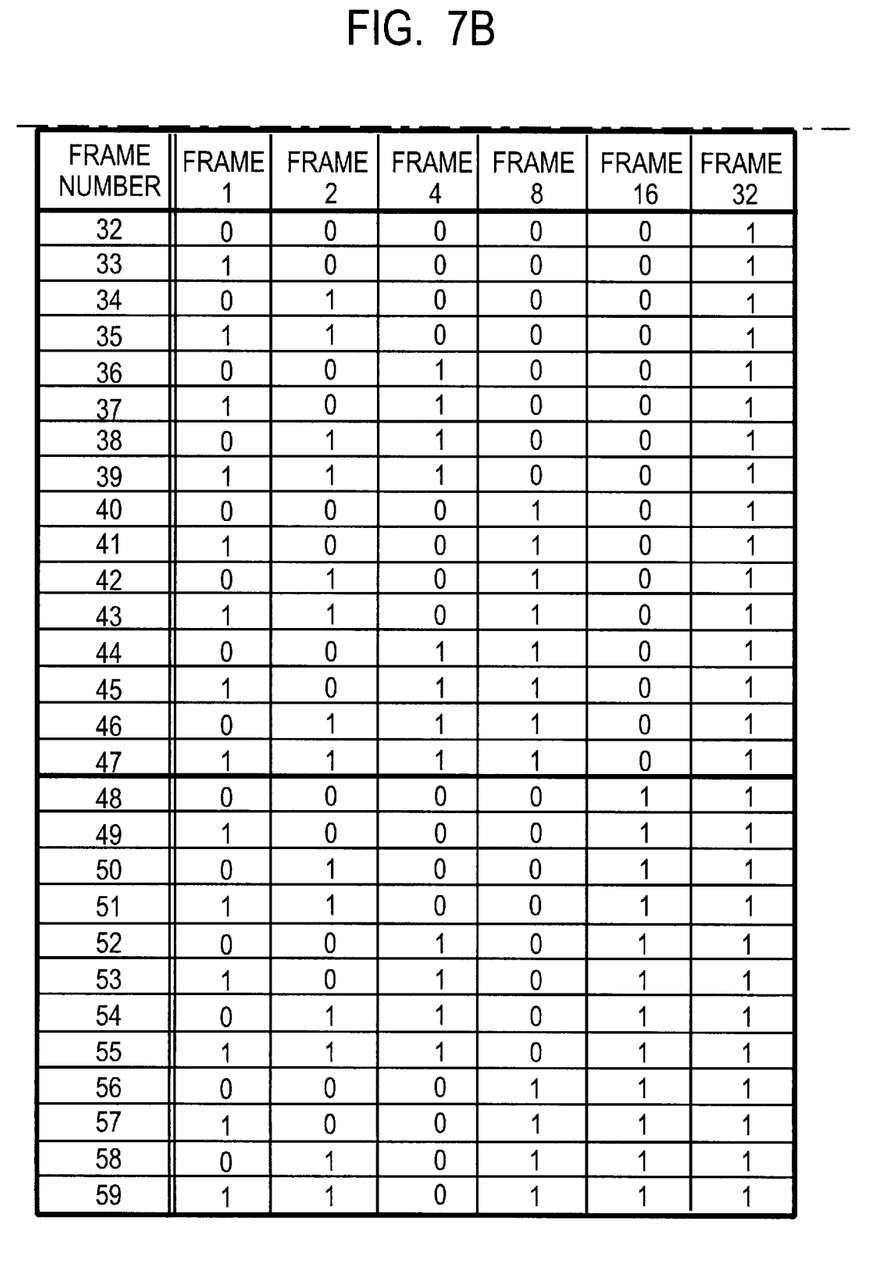

A time code of a recording-reproducing apparatus of the third embodiment is different from that of the first and second embodiments as shown in FIG. 7, which is still another embodiment for increasing the number of time codes expressible for one second by changing the expression method of six bits in the frame number indication area 3 shown in FIG. 3 instead of securing unnecessary bits.

The BCD notation is conventionally used for the value of a frame number. In the case of this notation, however, only up to 40 frames can be expressed. Therefore, as shown in FIG. 7, by expressing a frame number with the binary notation, up to 64 frames can be expressed. Sixty-four frames can correspond to 60 frames per sec of a progress signal in the case of 525P.

Figure 8:
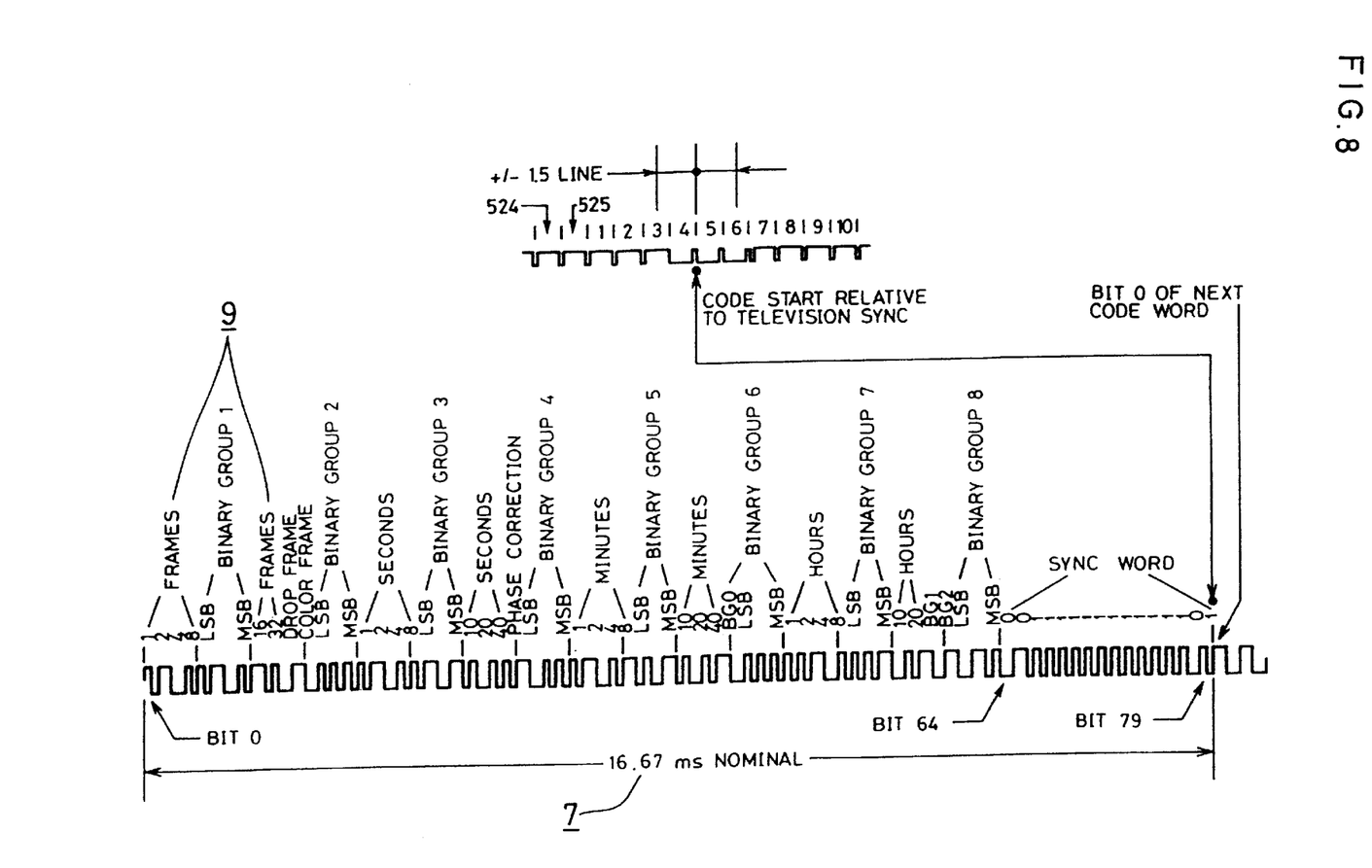
FIG. 8 is an illustration of the 525P system of the recording-reproducing apparatus of the third embodiment.

FIG. 8 shows an LTC waveform example of this the third embodiment, which is an example of the linear time code according to the 525P system for expressing a frame number with the binary notation. The time code is different from a conventional time code in weighting a frame expression bit, in which, as shown in FIG. 8, six bits of the binary notation area 9 of a frame number are constituted with 1FRAME, 2FRAME, 4FRAME, 8FRAME, 16FRAME, and 32FRAME. Moreover, to correspond to a progress signal, the LTC cycle 7 of an LTC waveform is halved to 16.67 ms and the LTC waveform is constituted with 60 time codes per sec. Therefore, it is possible to realize time codes accurately corresponding to 60 screens per sec of a progress signal.

What is claimed is:

1. A recording-reproducing apparatus comprising:
    a recording medium having a time code signal including a time code recorded in a linear track of a tape-like reading medium; and
    means for recording a picture signal in a helical track of the medium and simultaneously recording said time code signal in a linear track of the medium, said recorded time code signal including said frame number expressed with binary notation and recorded every vertical period of said picture signal, and
    said time code signal has a frame number expressed in decimal notation and has six bits assigned to said frame number for expressing said frame number in binary notation, wherein a frame expression bit is constituted with 1FRAME, 2FRAME, 4FRAME, 8FRAME, 16 FRAME and 32 FRAME to correspond to 60 frames/ sec.

2. The recording-producing apparatus according to claim 1 wherein the time code cycle of a time code waveform is 16.67 ms.

* * * * *